Dec. 18, 1956   J. E. ANTONIDIS ET AL   2,774,894
CONNECTOR FOR AN ELECTRIC MOTOR
Filed July 13, 1953
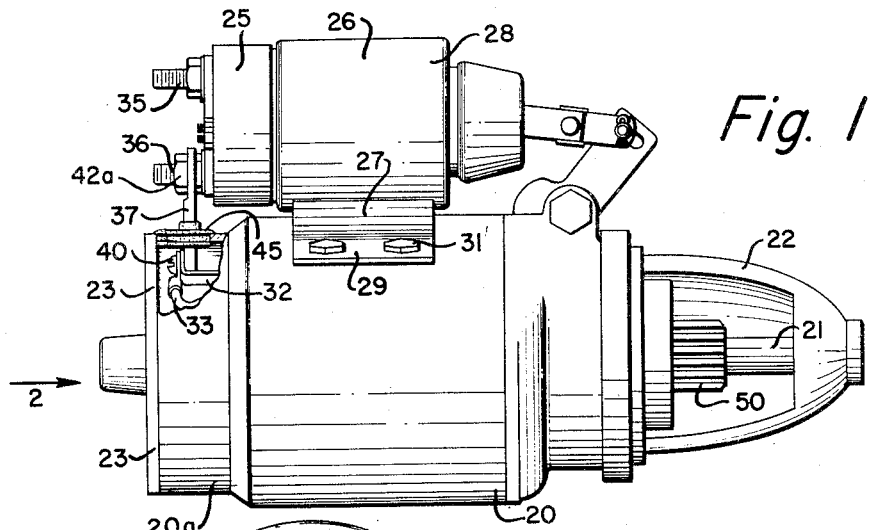
Fig. 1
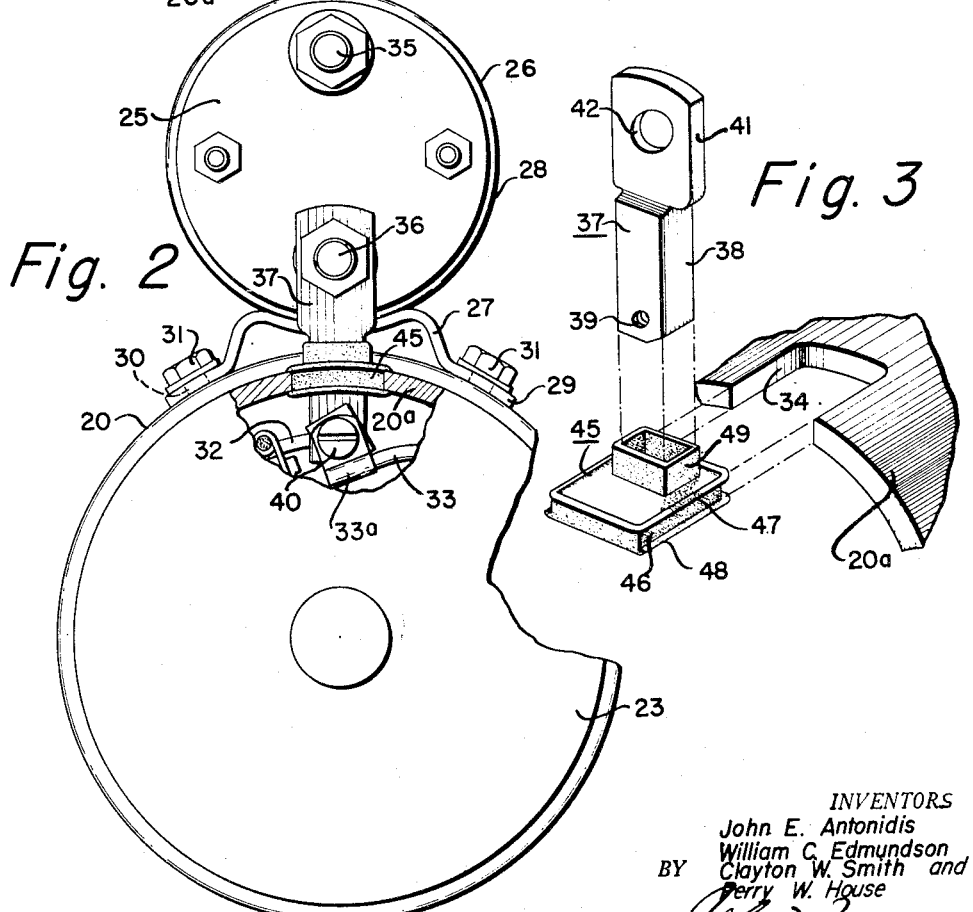
Fig. 2
Fig. 3
INVENTORS
John E. Antonidis
William C. Edmundson
BY Clayton W. Smith and
Perry W. House
Their Attorney United States Patent Office 2,774,894
Patented Dec. 18, 1956

2,774,894

CONNECTOR FOR AN ELECTRIC MOTOR

John E. Antonidis, William C. Edmundson, and Clayton W. Smith, Anderson, and Perry W. House, Pendleton, Ind., assignors to General Motors Corporation, Detroit, Mich., a corporation of Delaware Application July 13, 1953, Serial No. 367,484

4 Claims. (Cl. 310—71)

This invention relates primarily to improved means for connecting a control switch to the field winding or windings of an electric motor and is particularly designed for use with the starting motor of an automotive engine but, obviously, is applicable to other motors and, in fact, to other electrical devices.

Heretofore, it has been generally customary to connect one of the contacts of the control switch with the field winding of a starting motor by means of an insulated terminal bolt which extends through and is secured in position on the starting motor. The external portion of this bolt is generally connected by a strap with a stationary contact of the control switch and the internal portion of such terminal bolt is connected with the field winding. It is somewhat difficult to connect the field winding to a fixed terminal inside the field frame and such operation is not only time-consuming but the resulting connection is not always entirely satisfactory. If the operator is careless or hurried, the connection may not be properly made and may become loose. If so, the connection must be re-made and it is a matter of some importance to provide a means for connecting the control switch to the field winding which is so arranged that the point of connection to the winding is readily accessible to the operator.

It is, therefore, the principal object of the present invention to provide novel and improved means for connecting the control switch of an electric motor, which is positioned on the outside of the field frame of the motor, to the field winding or windings of such motor which is so constructed that the terminals which comprise part of the connecting means are readily accessible in order that the time required to assemble the connecting means and the probability of making faulty connections is reduced to a minimum.

According to the present invention, this object is accomplished by the provision of an opening or slot in the motor field frame at one end thereof in which a conductor bar may be properly positioned after one end of such bar is connected to the field winding or windings through the medium of one or more terminals which are electrically connected with the winding or windings. These terminals may be secured to the bar before it is in its properly assembled position in the slot, and before the other end of the bar is connected to the control switch. A soft rubber grommet is provided, through which the bar extends and this grommet, when the bar is assembled, completely fills the slot through which the bar extends and performs two functions, i. e. insulating the bar from the edges of the slot and sealing the slot against admission of moisture and dirt, said grommet being provided with flanges which extend over the edges of the slot both outside and inside the field frame.

Further objects and advantages of the present invention will be apparent from the following description, reference being had to the accompanying drawings wherein a preferred embodiment of the present invention is clearly shown.

In the drawings:

Figure 1 is a side view, partly in section, of an engine starting motor embodying the present invention;

Figure 2 is an end view, on an enlarged scale, looking in the direction of the arrow 2 in Figure 1; and Figure 3 is an exploded perspective view of the conductor bar, the grommet and a fragment of the field frame.

As already indicated according to the present invention, the conductor bar having a soft rubber grommet surrounding it and capable of handling high amperage circuits, can be first secured to a lead or leads connected with the field winding or windings and extending into the field frame of the motor before the end plate is attached to the motor field frame and the conductor bar can then be moved to its proper position in a slot in the end of the field frame thereafter connected to a terminal of a control switch which is supported on the outside of the field frame and the end plate secured to the frame. The slot is closed when the end plate is attached to the frame while the end plate also maintains the rubber grommet in position within the slot.

Referring to the drawings, the numeral 20 designates the field frame of an electric starting motor for an automotive engine. This field frame supports, in the specific device disclosed, a series and shunt field winding for energizing the motor armature (not shown), which is carried by a shaft 21 rotatable in suitable bearings provided by a housing 22 and the end member 23, respectively, both of which are secured to the field frame in any suitable way. The operation of the starting motor is controlled by a switch designated in its entirety by the numeral 25, which is operated by a solenoid unit 26 mounted on the field frame 20 by means of a bracket 27. The bracket 27 is spot-welded to the shell 28 of the solenoid unit and has curved flanges 29 which fit the outer contour of the field frame 20. The bracket has four openings 30 which receive attaching screws 31 for securing the bracket 27 to the field frame in the position shown in the drawings.

One end of a field winding is connected to the flexible strip 32 while another winding has a lead 33 to which is secured a clip 33a, both of the foregoing leads being connected to a conductor bar 37, while other leads (not shown), make proper electrical connections with brushes that ride on a commutator, in the conventional manner. The leads which are connected to the bar 37 are of sufficient length to be easily connected to the bar before it is moved to the assembled position of Fig. 1.

As shown in Fig. 1, the field frame is reduced in diameter adjacent one end, as indicated at 20a. This reduced portion of the frame is shown as having a notch or slot 34 extending inwardly from the end of the reduced portion. It is to be understood that the end of the frame could be provided with an opening of any suitable shape and that the end of the field frame does not have to be reduced in size.

The switch 25 which is operated by the solenoid unit 26 includes terminal bolts 35 and 36 the heads of which provide stationary contacts which are adapted to be bridged by a movable contact which is operated by the solenoid unit 26. The specific construction of the switch is not material so far as the present invention is concerned, but it may be of the same construction as illustrated in the patent to Antonidis, No. 2,482,534. The terminal bolt 36 is connected to the conductor bar 37, previously mentioned, so that the bar constitutes an electrical connection between the motor control switch and the field winding or windings of said motor, and the bar is of such dimensions that it will carry a high amperage current.

The clip 33a is connected to the bar 37 by a screw 40 which engages the opening 39 shown in Fig. 3, and at the upper end of the bar it has a flat portion 41 with an opening 42 through which the terminal bolt 36 extends when the bar is properly connected. It will be understood that the leads 32 and 33 are of sufficient length to permit such leads to be easily connected to the lower end of the bar 37 before the bar is in its final position of assembly and the point of attachment of said leads is readily accessible to the operator who assembles the device. After the leads have been attached to the lower end of the conductor bar, it may be pushed into its final position in the slot 34 so that opening 42 will engage the terminal bolt 36 and a retaining nut 42a can then be tightened to hold the bar in position and insure a good contact with the switch terminal.

Before the leads 32 and 33 are connected to the conductor bar 37 a soft rubber grommet 45 is positioned on a rectangular portion 38 of the bar. As shown, the grommet has a groove 46 and projecting flanges 47 and 48. The groove engages the edges of slot 34 and the flanges engage the inner and outer surfaces of the field frame adjacent the edge of the slot to seal the slot against admission of moisture and dirt and the flanges also hold the grommet in position in the slot 34. A rectangular and tubular portion 49 of the grommet which extends upwardly from the main portion thereof as indicated in Fig. 3 fits tightly around the bar 37 and acts as a seal to prevent admission of moisture or dirt around the bar. Obviously, the grommet also prevents any possible contact of the bar with the edges of the slot 34 in which the bar is positioned, and, therefore, constitutes an insulating means.

It should be apparent from the foregoing that the connection of the conductor bar to the field winding can be very quickly and easily effected when the motor is originally assembled. Also, if this connection should become loose during use of the motor, the end plate 23 can be removed, the connection of the bar with bolt 36 can be loosened and the bar easily moved to a position where the connection with the clip 33a is easily accessible so that such connection can be tightened with a minimum of time and labor.

To compensate for slight manufacturing variations, the solenoid 26 is slightly adjustable on the field frame, the attaching screws 31 extending through openings 30 which may be somewhat larger than the diameter of the screws, so that the position of the supporting bracket can be slightly varied with respect to the field frame for purposes of adjustment, as disclosed in copending application of Edmundson, Ser. No. 363,883, filed June 1, 1953.

As shown in the drawings, there are two leads 32 and 33 which are connected to the bar 37 by the screw 40. These extend to two field windings, neither one of which is shown, the lead 33 connecting bar 37 with a shunt field winding. Obviously, as far as this invention is concerned, the shunt field winding could be omitted and only one lead connected with the bar 37.

While the embodiment of the present invention as herein disclosed constitutes a preferred form, it is to be understood that other forms might be adopted.

What is claimed is as follows:

1. In an electric motor having a field frame in which a field winding is positioned and a motor control switch mounted on the outside of said frame, means for connecting a terminal of said control switch with the end of said field winding comprising a conductor bar adapted to be positioned in a slot formed in the end of the field frame and movable therein for connection with the field winding, said bar being connected at one end with a terminal of the control switch and at the other end with a lead extending from the field winding and of sufficient length to permit easy connection of the lead with the conductor bar when the latter is movable in said slot, and before it is secured in its final position of assembly therein, and a relatively soft rubber grommet surrounding said conductor bar in sealing engagement therewith and of such size as to completely fill the space between the bar and the wall of the slot in which said bar is received.

2. In an electric motor having a field frame in which a field winding is positioned and a motor control switch mounted on the outside of said frame, means for connecting a terminal of said control switch with the end of said field winding comprising a conductor bar adapted to be positioned in a slot formed in the end of the field frame and movable therein for connection with the field winding, said bar being connected at one end with a terminal of the control switch and at the other end with a lead extending from the field winding and of sufficient length to permit connection of the lead with the conductor bar when the latter is movable in said slot, a relatively soft rubber grommet surrounding said conductor bar in sealing engagement therewith, said grommet being of such size as to completely fill the space between the bar and the wall of the slot in which it is positioned and having peripheral flanges extending therefrom to engage the inside and outside surface of the field frame adjacent said slot.

3. In an electric motor having a field frame in which a field winding is positioned and a motor control switch mounted on the outside of said frame, means for connecting a terminal of said control switch with the end of said field winding comprising a conductor bar adapted to be positioned in a slot formed in the end of the field frame and movable therein for connection with the field winding, said bar being connected at one end with a terminal of the control switch and at the other end with a lead extending from the field winding and of sufficient length to permit connection of the lead with the conductor bar when the latter is movable in said slot and before it is secured in its final position of assembly, a relatively soft rubber grommet surrounding said conductor bar in sealing engagement therewith and of such size as to completely fill the space between the bar and the wall of the slot in which said bar is received, and an end plate secured to the end of the motor field frame in engagement with one end of said grommet so as to prevent any longitudinal movement of said grommet in its retaining slot.

4. In an electric motor having a field frame in which a field winding is positioned and a motor control switch mounted on the outside of said frame, means for connecting a terminal of said control switch with the end of said field winding comprising a conductor bar adapted to be positoned in a slot formed in the end of the field frame and movable therein for connection with the field winding, said bar being connected at one end with a terminal of the control switch and at the other end with a lead extending from the field winding and of sufficient length to permit connection of the lead with the conductor bar when the latter is movable in said slot and before it is secured in its final position of assembly, a relatively soft rubber grommet surrounding said conductor bar in sealing engagement therewith and of such size as to completely fill the space between the bar and the wall of the slot in which said bar is received, and an end plate secured to the end of the motor field frame in engagement with one end of said grommet so as to prevent any longitudinal movement of said grommet in its retaining slot, an upper flange extending laterally from the entire periphery of said grommet so as to engage the outer surface of the field frame and end plate and an inner flange extending laterally only from a part of the periphery of said grommet to engage the inner surface of the field frame.

References Cited in the file of this patent

UNITED STATES PATENTS

| | | |
|---|---|---|
| 863,207 | Olds | Aug. 13, 1907 |
| 1,743,860 | Meunier | Jan. 14, 1930 |
| 2,421,456 | Judisch | June 3, 1947 |
| 2,531,110 | Cisler | Nov. 21, 1950 |
| 2,590,559 | Miller | Mar. 25, 1952 |